United States Patent
Horn et al.

(10) Patent No.: US 10,728,147 B2
(45) Date of Patent: Jul. 28, 2020

(54) COLLECTION OF FORWARDING RULES

(71) Applicant: FUJITSU LIMITED, Kawasaki-shi, Kanagawa (JP)

(72) Inventors: Alexander Horn, Sunnyvale, CA (US); Eric Campbell, Sunnyvale, CA (US); Mukul R. Prasad, Sunnyvale, CA (US)

(73) Assignee: FUJITSU LIMITED, Kawasaki (JP)

(*) Notice: Subject to any disclaimer, the term of this patent is extended or adjusted under 35 U.S.C. 154(b) by 70 days.

(21) Appl. No.: 16/123,992

(22) Filed: Sep. 6, 2018

(65) Prior Publication Data
US 2020/0084145 A1 Mar. 12, 2020

(51) Int. Cl.
*H04L 12/715* (2013.01)
*H04L 12/741* (2013.01)
*H04L 12/26* (2006.01)
*H04L 12/813* (2013.01)
*H04L 12/801* (2013.01)
*H04L 12/721* (2013.01)
*H04L 12/759* (2013.01)

(52) U.S. Cl.
CPC .............. *H04L 45/64* (2013.01); *H04L 43/04* (2013.01); *H04L 45/70* (2013.01); *H04L 45/74* (2013.01); *H04L 47/19* (2013.01); *H04L 47/20* (2013.01); *H04L 45/028* (2013.01)

(58) Field of Classification Search
CPC ......... H04L 45/64; H04L 43/04; H04L 47/19; H04L 45/74; H04L 45/70; H04L 47/20; H04L 45/028
See application file for complete search history.

(56) References Cited

U.S. PATENT DOCUMENTS

| 2014/0369209 A1* | 12/2014 | Khurshid | H04L 41/0866 370/250 |
| 2017/0289189 A1* | 10/2017 | Bush | H04L 43/12 |
| 2018/0077061 A1* | 3/2018 | Horn | H04L 45/745 |
| 2018/0212870 A1* | 7/2018 | Horn | H04L 45/48 |

OTHER PUBLICATIONS

U.S. Appl. No. 15/860,558, filed on Jan. 2, 2018.
(Continued)

*Primary Examiner* — Pao Sinkantarakorn
*Assistant Examiner* — Kabir U Jahangir
(74) *Attorney, Agent, or Firm* — Maschoff Brennan

(57) ABSTRACT

A method may include obtaining a forwarding rule associated with a network. The method may also include identifying a property associated with the network. The property may include a property value comprising a duration value. Additionally, the method may include validating, for the forwarding rule, the property in the network. Responsive to the property being valid for the forwarding rule, the method may include updating the duration value based on a first equation set. Responsive to the property being invalid for the forwarding rule, the method may include updating the duration value based on a second equation set. Furthermore, the method may include calculating a length of validity value of the property. The length of validity value may be based on the updated duration value. The method may include performing network monitoring. The network monitoring may be based on the length of validity value of the property.

17 Claims, 9 Drawing Sheets

(56) References Cited

OTHER PUBLICATIONS

Prakash et al. "PGA: Using Graphs to Express and Automatically Reconcile Network Policies" SIGCOMM, (Aug. 2015).
Zhou et al. "NEAt: Network Error Auto-Correct" SORS, (Apr. 2017).
Ball, T., Bjørner et al. "VeriCon: Towards verifying controller programs in software—defined networks" PLDI, (Jun. 2014).
Beckett et al. "An assertion language for debugging SDN applications" HotSDN (Aug. 2014).
Canini, M. et al. :A Nice way to test openflow applications NSDI (2012).
Fayaz, S. K., and Sekar, V. "Testing stateful and dynamic data planes with FlowTest" HotSDN (Aug. 2014).
Fayaz, S. K., Yu, T., Tobioka, Y., Chaki, S., and Sekar, V. "Buzz: Testing context-dependent policies in stateful networks" NSDI (Mar. 2016).
Stoenescu, R., Popovici, M., Negreanu, L., and Raiciu, C. "SymNet: Scalable symbolic execution for modern networks" SIGCOMM (2016).
Velner, Y., Alpernas, K., Panda, A., Rabinovich, A., Sagiv, M., Shenker, S., and Shoham, S. "Some complexity results for stateful network verification" TACAS (2016).
Al-Shaer, E., and Al-Haj, S. "FlowChecker: Configuration analysis and verification of federated OpenFlow Infrastructures" SafeConfig (Oct. 2010).
Al-Shaer, E., Marrero, W., El-Atawy, A., and El- Badawi, K. "Network configuration in a box: towards end- to- end verification of network reachability and security" CNP (2009).
Bjørner, N., Juniwal, G., Mahajan, R., Seshia, S. A., and Varghese, G. "ddNF: An efficient data structure for header spaces" Tech. rep., Microsoft Research, 2015.
Fogel, A., Fung, S., Pedrosa, L., Walraed-Sullivan, M., Govindan, R., Mahajan, R., and Millstein, T. "A general approach to network configuration analysis" NSDI (2015).
Gember-Jacobson, A., Viswanathan, R., Akella, A., and Mahajan, R. "Fast control plane analysis using an abstract representation" SIGCOMM (2016).
Jayaraman, K., Bjørner, N., Outhred, G., and Kauf- Man, C. "Automated analysis and debugging of network connectivity policies" Tech. rep., Microsoft Research, 2014.
Jeffrey, A., and Samak, T. "Model checking firewall policy configurations" Policy (2009).
Kazemian, P., Chang, M., Zeng, H., Varghese, G., McKeown, N., and Whyte, S. "Real time network policy checking using header space analysis" NSDI (2013).
Kazemian, P., Varghese, G., and McKeown, N. "Header space analysis: Static checking for networks" NSDI (2012).
Khurshid, A., Zou, X., Zhou, W., Caesar, M., and God- Frey, P. B. "VeriFlow: Verifying network-wide invariants in real time" NSDI (2013).
Lopes, N. P., Bjørner, N., Godefroid, P., Jayaraman, K., and Varghese, G. "Checking beliefs in dynamic networks" NSDI (2015).
Mai, H., Khurshid, A., Agarwal, R., Caesar, M., God- Frey, P. B., and King, S. T. "Debugging the data plane with Anteater" SIGCOMM (2011).
Maldonado-Lopez, F. A., Calle, E., and Donoso, Y. "Detection and prevention of firewall-rule conflicts on software-defined networking" RNDM (2015).
Nelson, T., Barratt, C., Dougherty, D. J., Fisler, K., and Krishnamurthi, S. "The Margrave tool for firewall analysis" Lisa (2010).
Son, S., Shin, S., Yegneswaran, V., Porras, P. A., and Gu, G. "Model checking invariant security properties in Open- Flow" ICC (2013).
Xie, G. G., Zhanm, J., Maltz, D. A., Zhang, H., Green- Berg, A., Hjalmtysson, G., and Rexford, J. "On static reachability analysis of IP networks" INFOCOM (2005).
Yang, H., and Lam, S. S. "Real-time verification of network properties using atomic predicates" ICNP (2013).
Yuan, L., Mai, J., Su, Z., Chen, H., Chuah, C.-N., and Mohapatra, P. "Fireman: A toolkit for firewall modeling and analysis" SP (2006).

\* cited by examiner

COLLECTION OF FORWARDING RULES

FIELD

The embodiments discussed in the present disclosure relate to collection of forwarding rules.

BACKGROUND

A software-defined network (SDN) may include a series of network objects (e.g., switches, routers, firewalls), which may be automated via commercial or open source tools and/or customized according to one or more requirements (e.g., requirements of a network administrator). Network functions virtualization (NFV) includes moving network functions (e.g., functions performed by routers, firewall, load balancers), which are performed by dedicated hardware, into a virtualized environment.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method. The method may include obtaining a forwarding rule associated with a network. The method may also include identifying a property associated with the network. The property may include a property value comprising a duration value. Additionally, the method may include validating, for the forwarding rule, the property in the network. Responsive to the property being valid for the forwarding rule, the method may include updating the duration value based on a first equation set. Responsive to the property being invalid for the forwarding rule, the method may include updating the duration value based on a second equation set. Furthermore, the method may include calculating a length of validity value of the property. The length of validity value may be based on the updated duration value. The method may include performing network monitoring. The network monitoring may be based on the length of validity value of the property.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
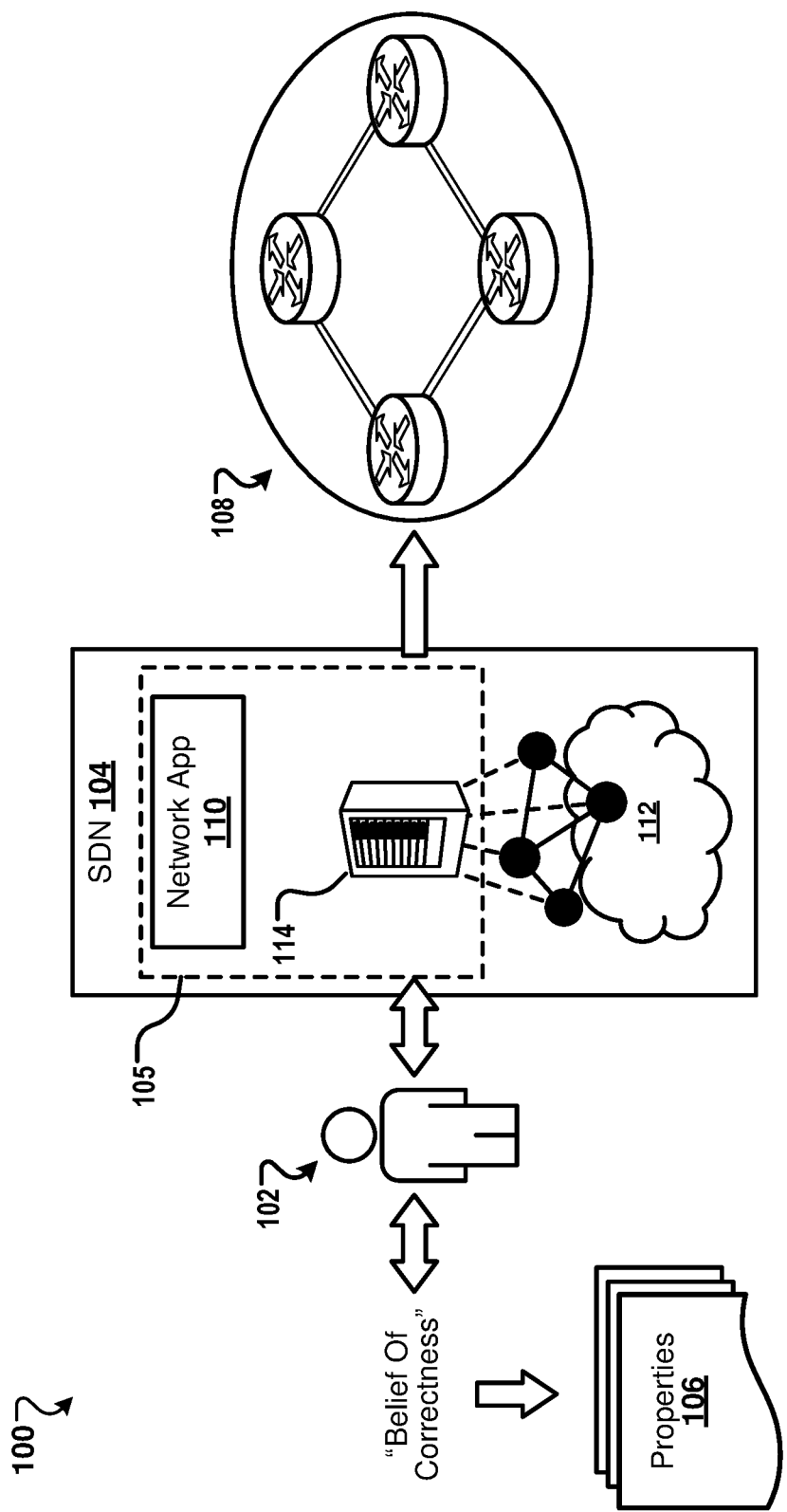
FIG. 1 illustrates an example system that may be used for determining a length of validity value of properties.

Communication networks may include multiple switches that may route packets of information to different elements of the networks based on forwarding rules that apply to each switch. In some instances, the forwarding rules may correspond to network addresses that may be included in the packets in that certain rules may correspond to certain network addresses that are within a specific address range.

Although communication networks may change frequently (e.g., due to failures, changes by network operators, or other reasons), there may be one or more inherent invariant properties that may be maintained by the network. The present disclosure relates to determining a length of validity value of properties using one or more forwarding rules.

As used in the present disclosure, the term "data plane" may refer to communications and connections used in the transmission and reception of data through the network, and may include the actual physical connections available within the network. As used in the present disclosure, the term "control plane" may refer to communications and connections used in the control and administration of a network itself, rather than the transmission of data through the network, which may occur at the data plane. For example, the control plane may include administrative traffic directed to a network device within a network, while the data plane may include traffic that passes through network devices within the network.

In an ever-increasing interconnected world, network traffic is increasingly diverse and demanding, ranging from communication between small everyday devices to largescale data centers. This diversity has driven the design and rapid adoption of new open networking architectures, built on programmable network switches, which make it possible to separate the control plane from the data plane.

A forwarding rule may indicate for a given network switch where to forward a packet or set of packets. For example, a forwarding rule may indicate that a group of packets within a range of network addresses identified by an IP prefix are to be routed from a first receiving network switch to a destination network switch. Additionally or alternatively, a forwarding rule may include a priority associated with that rule, such that if two forwarding rules for a switch cover the same or overlapping ranges, the switch will know which forwarding rule to follow when forwarding a packet within the range.

Some data plane checking technologies may capture the forwarding rules of an entire network. Such data plane checking technologies may give equal weight to each forwarding rule. For example, a temporary forwarding rule may be given equal weight as a persistent forwarding rule. Additionally, such data plane checking technologies may not be able to fully describe properties of the network. For example, such data plane technologies may generate a summary of the forwarding rule of an entire network and assume all traffic goes through a particular switch or network device of the network based on the summary, whereas the traffic may not always go through the particular switch or network device. Additionally, such data plane checking technologies may wait for the network to become stable before detecting bugs, errors, or other issues with the network, which may be difficult in networks that are consistently changing.

According to various embodiments, as described more fully below, a length of validity value of properties may be determined. The length of validity value of the properties may be used to distinguish between temporary forwarding rules and persistent forwarding rules. Additionally, the length of validity value of the properties may indicate an anomaly in the network to measure and/or monitor to determine whether an error has occurred in the network.

In some embodiments, one or more forwarding rules may be obtained. In these and other embodiments, two or more properties to be validated in the network may also be obtained. Each property may include a property value that includes a duration value. The duration values may indicate a duration in which the corresponding properties were valid in a model of the network under changes induced by the forwarding rules. For example, a first property may be validated in models of the network for a first forwarding rule and a second forwarding rule.

In response to the properties being valid for a forwarding rule, the property value, including the duration value, may be updated according to a first equation set as discussed in more detail below. In response to the property not being valid for a forwarding rule, the property value, including the duration value, may be updated according to a second equation set as discussed in more detail below.

In some embodiments, each property value may be ranked according to the updated duration values. In these and other embodiments, the property that includes the property value with the relatively greater value of the two property values may be classified as a relatively longer valid property (e.g., a relatively longer lived property).

Embodiments of the present disclosure are now explained with reference to the accompanying drawings.

FIG. 1 illustrates an example system 100 that may be used for determining a length of validity value of properties 106. System 100 includes a network administrator 102, a software-defined network (SDN) 104, the properties 106, and a data plane 108. The SDN 104 may include an SDN controller 114, a physical network 112, which may include the data plane 108, and a network application 110.

The properties 106 may include, for example, one or more network-wide invariants, which may be defined by the network administrator 102 for reaching one or more goals. For example, the properties 106 may include one or more reachability invariants. A reachability invariant may include a network destination that may be designed to be reachable from a first location. Other properties 106 may include any property that is configured to be reliable, unchanging, or available.

Table I illustrates example properties 106 that may be used in the physical network 112.

TABLE I

| PROPERTY | PARAMETERS | DESCRIPTION |
| --- | --- | --- |
| Reachability | S, T, and R | S may communicate with T for a range of IP addresses in R |
| Isolation | S, T and R | S may not communicate with T for a range of IP addresses in R |
| Waypoint | S, T, and W | Traffic from S to T may traverse an intermediate device W (e.g., a firewall) |
| Bounded Path Length | S, T, and k | S may reach T in k or fewer hops |
| Disjoint Paths | $S_1$, $T_1$, $S_2$, and $T_2$ | Traffic from $S_1$ to $T_1$ may not be simultaneously forwarded over the same link (in the same direction) as traffic from $S_2$ to $T_2$ |
| Aggregation | n | Only IP prefixes of length n or less may be advertised to the external network |
| Multipath Consistency | S, T, and R | In a multipath setting, traffic for IP addresses in range R may be treated the same (e.g., forwarded or dropped along all paths from S to T) |
| k-Multipath Consistency | S, T, and k | Like multipath consistency, except that there may be k paths from S to T |
| Equal-Length j-Multipath Consistency | S, T, j, and k | Like k-multipath consistency, except that every path may be j hops |
| Valley-Free | S, T | In a hierarchical network, traffic from S to T may ascend and/or descend the hierarchy with no intermediate ascents and descents |
| Locality | S, T | In a network with inherent clusters where S and T are in the same cluster, traffic S to T may not leave the cluster |

A control plane 105 of the system 100 may include the SDN controller 114 and the network application 110. The data plane 108 of the system 100 may include a snapshot of a configuration of various network switches and/or physical connections in the SDN 104 at a given time. As described above, the control plane 105 may facilitate management and/or control of the SDN 104, and the data plane 108 may facilitate the transmission of data through the SDN 104. For example, the solid circles of the physical network 112 may correspond to the switches within the data plane 108. Additionally or alternatively, the data plane 108 may include one or more virtualized network devices.

During operation of the physical network 112, an event (e.g., failure events (e.g., node, links), traffic events (e.g., feedback from devices to controller, additional/expiration of connection requests)) may cause the SDN controller 114 to modify the data plane 108. For example, a new network switch may be brought up in the physical network 112, or a physical link between two network devices may suffer a mechanical failure. As an additional example, a physical network switch may have a hardware or software failure. As another example, performance on a particular network link between two physical network devices may be analyzed and found to be below a threshold.

In some embodiments, the SDN controller 114 may determine the length of validity value of the properties 106 as discussed in more detail below. Additionally or alternatively, some other component of the system 100 may determine the length of validity values of the properties 106 as discussed in more detail below. In some embodiments, the SDN controller 114 may obtain one or more forwarding rules and determine which property of the properties 106 is a relatively longer valid property using the forwarding rules as discussed in more detail below. The relatively longer valid property may indicate an anomaly in the physical network 112 to measure and/or monitor to determine whether an error has occurred in the physical network 112.

In some embodiments, the SDN controller 114 may perform network monitoring based on the relatively longer valid property. Additionally or alternatively, the SDN controller 114 may perform network monitoring based on the relatively longer valid property and/or any of the other length of validity values. In some embodiments, the SDN controller 114 may monitor the various switches and/or network devices of the physical network 112 to determine whether the relatively longer valid property and/or any of the other properties 106 are still valid in the physical network 112. If the relatively longer valid property and/or any of the other properties 106 are still valid in the physical network 112, the SDN controller 114 may determine that the physical network 112 is operating satisfactorily. If the relatively longer valid property and/or any of the other properties 106 are no longer valid in the physical network 112, the SDN controller 114 may determine that the physical network 112 is not operating satisfactorily.

Performing network monitoring by monitoring the validity of the relatively longer valid property and/or the other properties 106 may reduce a number of switches in the physical network 112 that need to be monitored by the SDN controller 114. Additionally, performing network monitoring by monitoring the validity of the relatively longer valid property and/or the other properties 106 may reduce traffic on the control plane 105 since fewer switches may send status messages to the SDN controller 114. Furthermore, performing network monitoring by monitoring the validity of the relatively longer valid property and/or the other properties 106 may reduce data that is processed by the SDN controller 114.

Figure 8:
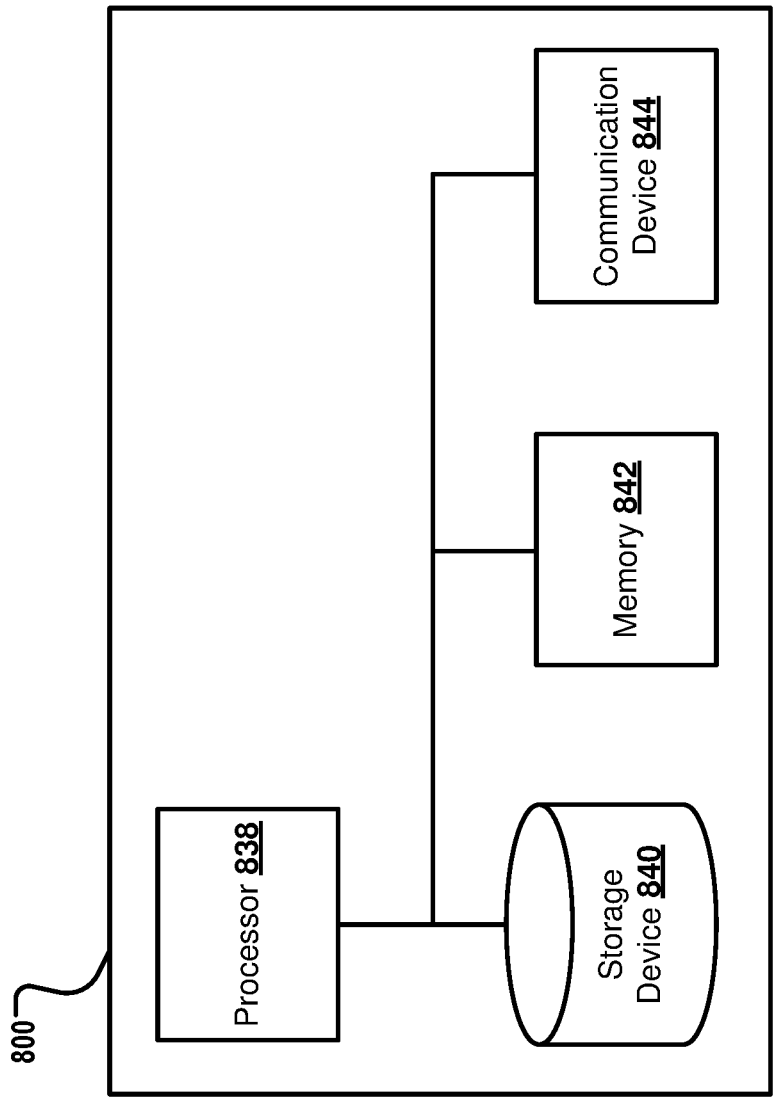
FIG. 8 is a block diagram of the example computing system, all according to at least one embodiment described in the present disclosure.

The SDN controller 114 may be implemented as an embodiment of a computing system 800 of FIG. 8, or as a virtualized machine running on a system, such as the computing system 800 of FIG. 8.

Figure 2:
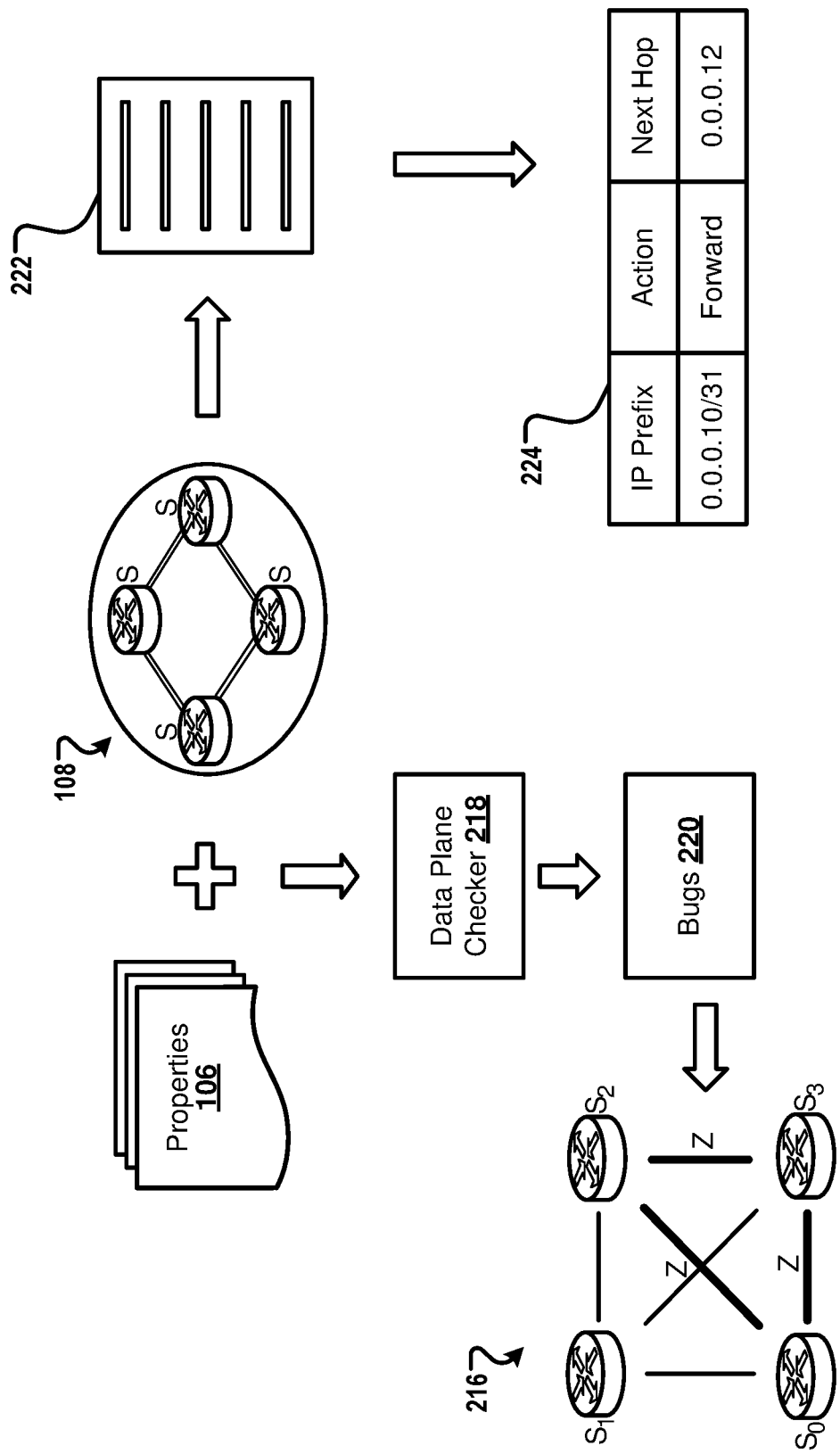
FIG. 2 illustrates example components that may be used for determining the length of validity value of the properties.

FIG. 2 illustrates example components that may be used for determining the length of validity value of the properties 106. The example components may include the properties 106 and the data plane 108. The data plane 108 may include one or more switches, designated by the letter S in FIG. 2. Each switch may be implemented physically as the computing system 800 of FIG. 8. Additionally, it will be appreciated that while the term "switch" is used, the term also contemplates a router, a hub, or any other network device.

Each switch S in the data plane 108 may include one or more forwarding tables 222, which may include one or more forwarding rules, such as example forwarding rule 224. The forwarding rules of the forwarding table 222 may provide instructions of how to route received packets through the network. For example, with reference to the forwarding rule 224, packets received at a switch with the forwarding rule 224 may check whether the IP address within the packets (e.g., the destination IP address, the source IP address, other IP addresses, and/or combinations thereof) falls within the range of addresses defined by the IP prefix associated with the forwarding rule. For example, the IP prefix "0.0.0.10/31" may be equivalent to the 32-bit sequence (4 bytes separated by dots) that starts with all zeros and ends with 101* (the binary representation of the numeral 10) where * denotes an arbitrary bit. Similarly, the IP prefix "0.0.0.0/28" may be equivalent to the 32-bit sequence starting with zeroes with four arbitrary bits at the end, e.g., 0 . . . 0****. Thus, the forwarding rule 224 may be potentially invoked for IP packets with the address with the numerical representation 0 . . . 01010 and 0 . . . 01011. If such a packet were received at the packet the action "forward" would be taken to forward the packet to the next hop address of 0.0.0.12.

FIG. 2 further depicts a data plane checker 218, which may be configured to detect one or more bugs 220. For example, the data plane checker 218 may include a suitable data plane checker, such as an HSA data plane checker, a Veriflow data plane checker, and/or a delta-net data plane checker. As an example, a bug may include an undesirable forwarding loop, as depicted by reference numeral 216. For example, a packet may enter an infinite forwarding loop between the switches $S_0$ and $S_2$ and $S_3$ such that a reachability query fails, or such that a property is not met. The data plane checker 218 may include a program or set of operations operating on a computing system (e.g., the computing system 800 of FIG. 8). In some embodiments, the data plane checker 218 may be implemented by the SDN controller 114 of FIG. 1.

Figure 3:
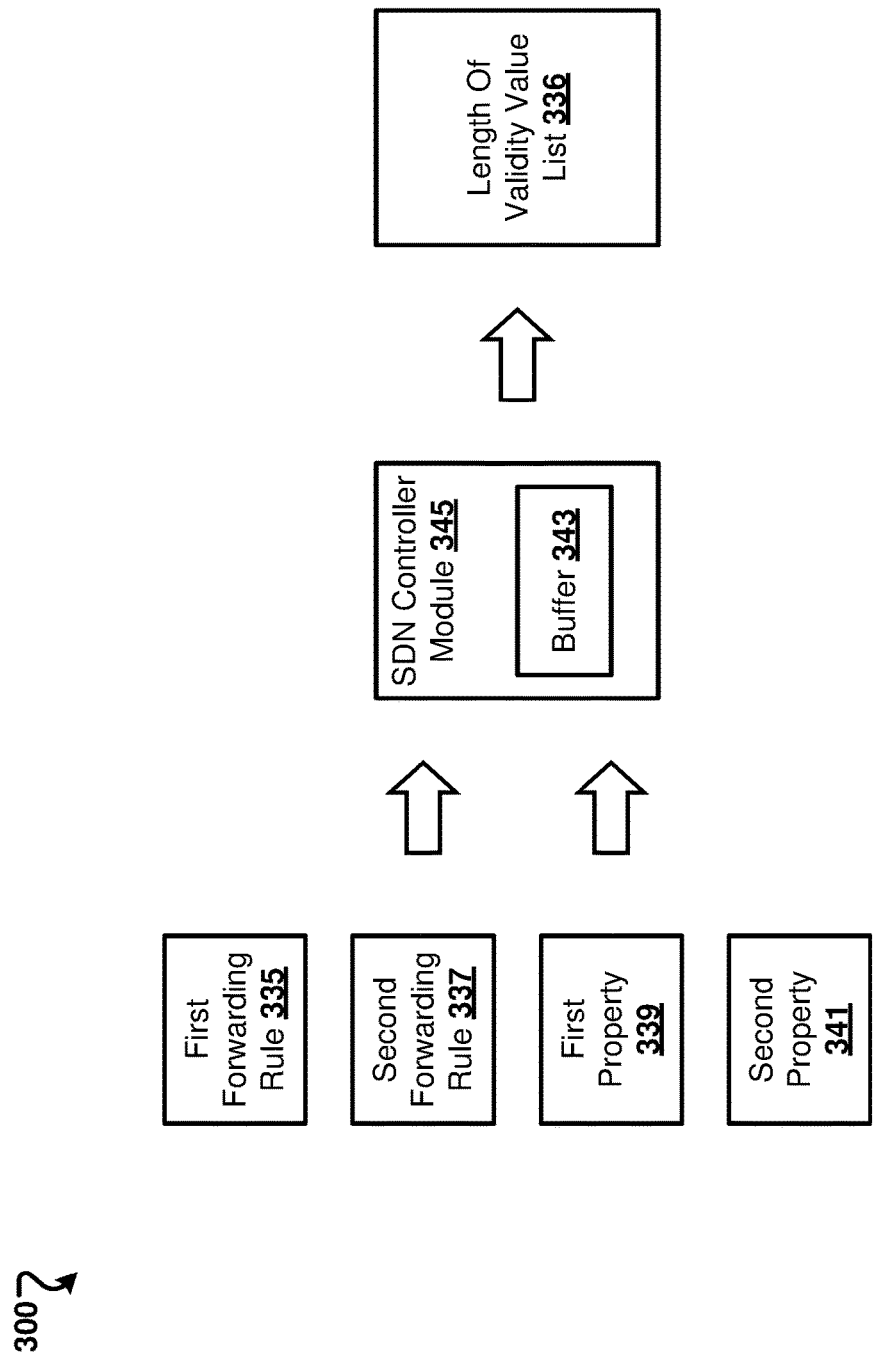
FIG. 3 illustrates an example environment related to determining the length of validity value of the properties.

FIG. 3 illustrates an example environment 300 related to determining the length of validity value of the properties. The environment 300 may include an SDN controller module 345 configured to determine the relatively longer valid property of the first property 339 and the second property 341 using a first forwarding rule 335 and a second forwarding rule 337. The first property 339 and the second property 341 may be associated with a network (e.g., the physical network 112 of FIG. 1). The SDN controller module 345 may be included in an SDN controller such as the SDN controller 114 of FIG. 1.

In some embodiments, the SDN controller module 345 may receive the first property 339 and the second property 341, e.g., from an SDN controller such as the SDN controller 114 of FIG. 1. Additionally, the SDN controller module 345 may receive the first forwarding rule 335 and the second forwarding rule 337, e.g., from an SDN controller such as the SDN controller 114 of FIG. 1. The SDN controller module 345 may determine the relatively longer valid property based on a duration value as discussed in more detail below. Additionally, the SDN controller module 345 may be configured to output a length of validity value list 336 that may include the first property 339 and the second property 341 listed in a sequence based on a corresponding length of validity value for each of the first property 339 and the second property 341 (e.g., ranked based on the length of time).

In some embodiments, the SDN controller module 345 may include code and routines configured to enable a computing device to determine the length of validity values of the first property 339 and the second property 341. Additionally or alternatively, the SDN controller module 345 may be implemented using hardware including a processor, a microprocessor (e.g., to perform or control performance of one or more operations), a field-programmable gate array (FPGA), or an application-specific integrated circuit (ASIC). In some other instances, the SDN controller module 345 may be implemented using a combination of hardware and software. In the present disclosure, operations described as being performed by the SDN controller module 345 may include operations that the SDN controller module 345 may direct a corresponding system to perform.

The SDN controller module 345 may be configured to perform one or more operations with respect to the first forwarding rule 335, the second forwarding rule 337, the first property 339, and the second property 341 that may be used to determine the length of validity value of the first property 339 and the second property 341. Additionally, the SDN controller module 345 may determine the length of validity value of the first property 339 and the second property 341 and may generate the length of validity value list 336 as discussed in more detail below.

In some embodiments, the SDN controller module 345 may include a buffer 343. The buffer 343 may be used to store the first forwarding rule 335 and the second forwarding rule 337 in a sequential order, as discussed in more detail below. The first forwarding rule 335 and the second forwarding rule 337 may be the same as or similar to the forwarding rule 224 discussed above in relation to FIG. 2.

In some embodiments, the first forwarding rule 335 may include a first time value that indicates a time the first forwarding rule 335 was generated. For example, the first forwarding rule 335 and the first time value may be received by the SDN controller module 345 as a pair (e.g., $(r_1, t_1)$, in which $r_1$ may be the first forwarding rule 335 and $t_1$ may be the first time value).

In some embodiments, the second forwarding rule 337 may include a second time value that indicates a time the second forwarding rule 337 was generated. For example, the second forwarding rule 337 and the second time value may be received by the SDN controller module 345 as a pair (e.g., $(r_2, t_2)$, in which $r_2$ may be the second forwarding rule 337 and $t_2$ may be the second time value).

In some embodiments, the first property 339 may include a first property value. The first property value may act as persistent storage of time sensitive information related to the first property 339. In some embodiments, the first property value may include a first duration value and a first property start time value. The first duration value may indicate a duration of time for which the first property 339 was valid for the first forwarding rule 335, the second forwarding rule 337, and/or additional forwarding rules. The first property start time value may indicate a time at which the first property 339 became valid for the first forwarding rule 335, the second forwarding rule 337, and/or additional forwarding rules. The first property value may be represented according to Equation 1:

$$R_1=(d_1,t_1), \qquad \text{Equation 1}$$

In Equation 1, $R_1$ may be the first property value, $d_1$ may be the first duration value, and $t_1$ may be the first property start time value. In some embodiments, the first duration value may be equal to or greater than zero. In these and other embodiments, the first property start time value may be equal to negative one or a positive integer. Additionally, in some embodiments, if the first property start time value is equal to negative one, the first property start time value may indicate that the first property 339 has not been validated with the first forwarding rule 335, the second forwarding rule 337, or additional forwarding rules.

In some embodiments, the second property 341 may include a second property value. The second property value may act as persistent storage of time sensitive information related to the second property 341. In some embodiments, the second property value may include a second duration value and a second property start time value. The second duration value may indicate a duration of time for which the second property 341 was valid for the first forwarding rule 335, the second forwarding rule 337, and/or additional forwarding rules. The second property start time value may indicate a time at which the second property 341 became valid for the first forwarding rule 335, the second forwarding rule 337, and/or additional forwarding rules. The second property value may be represented according to Equation 2:

$$R_2=(d_2,t_2), \qquad \text{Equation 2}$$

In Equation 2, $R_2$ may be the second property value, $d_2$ may be the second duration value, and $t_2$ may be the second property start time value. In some embodiments, the second duration value may be equal to or greater than zero. In these and other embodiments, the second property start time value may be equal to negative one or a positive integer. Additionally, if the second property start time value is equal to negative one, the second property start time value may indicate that the second property 341 has not been validated with the first forwarding rule 335, the second forwarding rule 337, and/or additional forwarding rules.

In some embodiments, the SDN controller module 345 may receive the first forwarding rule 335 and the second forwarding rule 337 one at a time. In other embodiments, the SDN controller module 345 may receive the first forwarding rule 335 and the second forwarding rule 337 in a group. For example, the first forwarding rule 335 and the second forwarding rule 337 may be received as part of a forwarding table, such as the forwarding table 222 discussed above in relation to FIG. 2. The SDN controller module 345 may store the first forwarding rule 335 and the second forwarding rule 337 in the buffer 343.

In some embodiments, the first forwarding rule 335 and the second forwarding rule 337 may be received out of order relative to the corresponding time values. For example, the first forwarding rule 335 may be received by the SDN controller module 345 before the second forwarding rule 337, but the first time value of the first forwarding rule 335 may be greater than the second time value of the second forwarding rule 337, which may indicate that the first forwarding rule 335 was generated after the second forwarding rule 337. In these and other embodiments, the SDN controller module 345 may arrange the first forwarding rule 335 and the second forwarding rule 337 in the buffer 343 in sequential order from earlier relative time to later relative time. Continuing with the previous example in which the first time value is greater than the second time value, indicating that the first forwarding rule 335 was generated after the second forwarding rule 337, the second forwarding rule 337 may be stored in front of the first forwarding rule 335 in the buffer 343. As another example, if the first time value is equal to eight seconds after a time reference event and the second time value is equal to twelve seconds after the time reference event, the first forwarding rule 335 may be stored in the buffer 343 in front of the second forwarding rule 337 since the first time value (e.g., eight seconds after the time reference event) is relatively earlier than the second time value (e.g., twelve seconds after the time reference event).

In some embodiments, the first forwarding rule 335 and the second forwarding rule 337 may be automatically arranged in the buffer 343 when received by the SDN controller module 345 based on the corresponding time values. For example, if the first forwarding rule 335 has previously been received and stored in the buffer 343 when the second forwarding rule 337 is received, the SDN controller module 345 may compare the second time value to the first time value and determine which forwarding rule was generated before the other and store the relatively earlier forwarding rule in the appropriate position in the buffer 343.

Figure 4A:
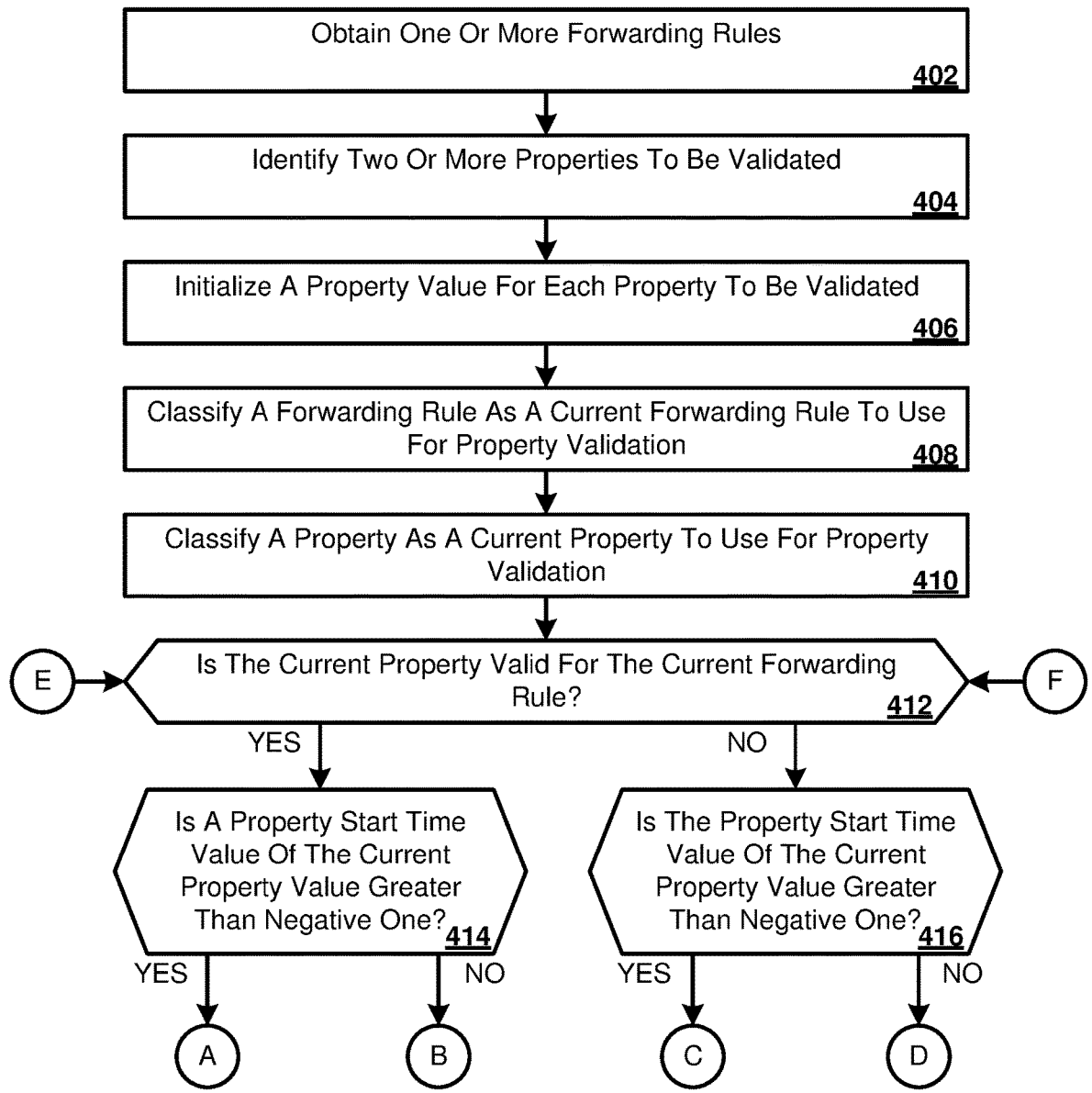
FIGS. 4A-4B illustrate a flowchart of an example method for determining the length of validity value of properties.
Figure 4B:
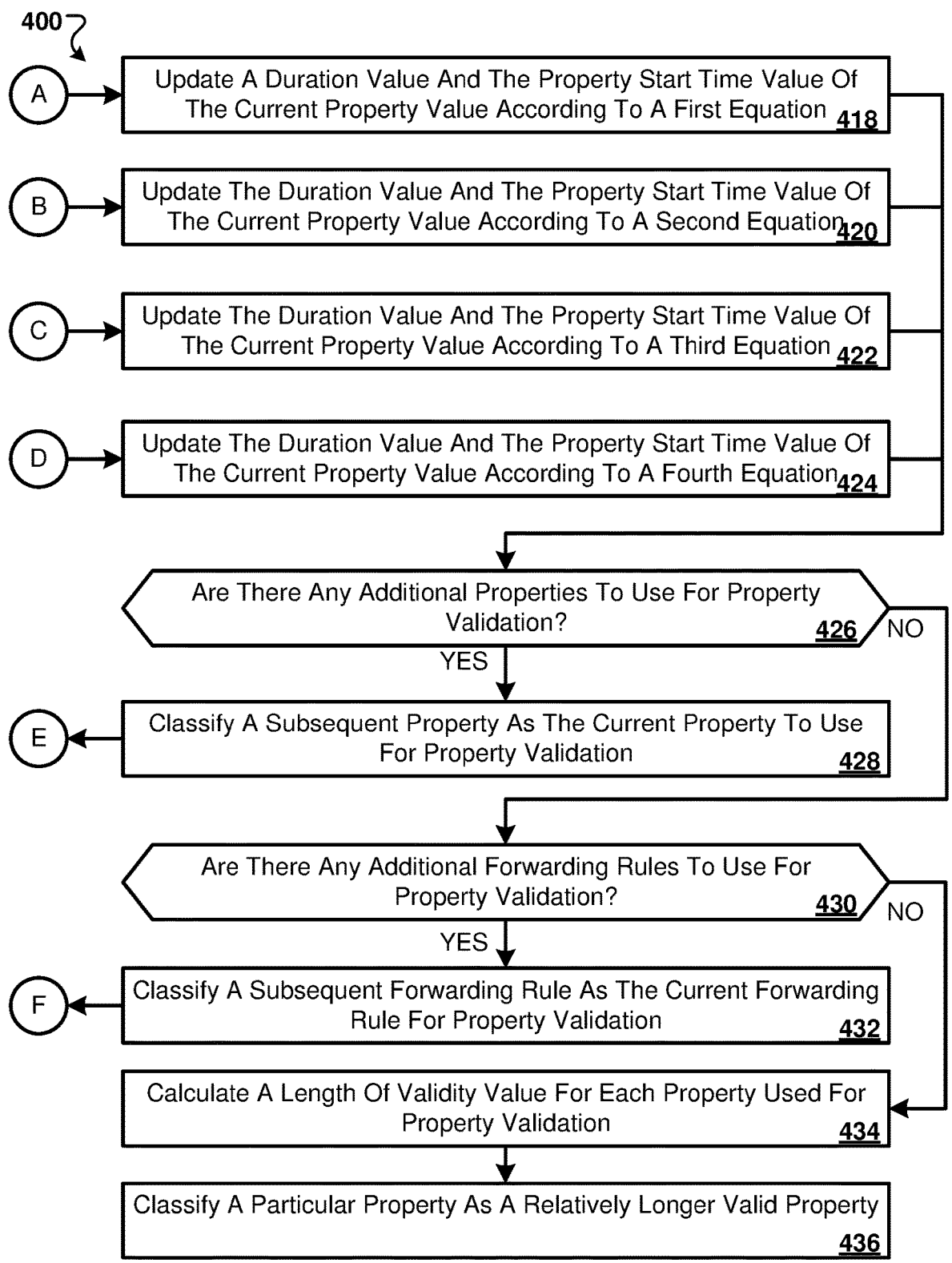

In some embodiments, the SDN controller module 345 may wait for a time period to elapse from the time value of a given rule in the buffer 343 prior to processing the given forwarding rule in the buffer 343, e.g., according to some or all of a method 400 of FIGS. 4A-4B. The time period may be based on any appropriate unit of measurement of time. The time period may be determined relative to the first time value and/or the second time value. The time period may be dynamically set, statically set, and/or set by a network administrator. As an example, the units of measurement may be seconds, the first time value may be equal to one second after the time reference event and the time period may be equal to five seconds. The SDN controller module 345 may continue to receive additional forwarding rules (e.g., the second forwarding rule 337 and/or additional forwarding rules) and storing the first forwarding rule 335 and the additional forwarding rules in the buffer 343 until the time is equal to seven seconds after the time reference event, since seven seconds minus one second is greater than five seconds (e.g., greater than the value of the time period). Additionally, after the time is equal to seven seconds after the time reference event, the SDN controller module 345 may continue to receive additional forwarding rules. Furthermore, when the time is equal to seven seconds, the SDN controller module 345 may process the first forwarding rule 335 to determine the length of validity value of the first property 339 and the second property 341 as discussed in the present disclosure.

Accordingly, the buffer 343 may permit forwarding rules that are received out of order (relative to the times at which the forwarding rules are generated) to be processed sequentially according to the times at which the forwarding rules are generated rather than according to the order in which the forwarding rules are received. The buffer 343 may output either the first forwarding rule 335 or the second forwarding rule 337 before the other depending on their time values, the forwarding rule that is output being referred to as a current forwarding rule to be processed in the discussion that follows. In some embodiments, other forwarding rules may be output before the first forwarding rule 335 or the second forwarding rule 337 and "current forwarding rule to be processed" as used herein merely refers to a given forwarding rule to be processed rather than, e.g., a specific forwarding rule output for processing.

In some embodiments, the SDN controller module 345 may classify the first property 339 and the second property 341 as properties to be validated. The SDN controller module 345 may initialize the first property value of the first property 339 and the second property value of the second property 341. In some embodiments, the first duration value of the first property value and the second duration value of the second property value may be set to zero and the first property start time value of the first property value and the second property start time value of the second property value may be set to negative one (e.g., set to indicate that the first property 339 and the second property 341 have not been validated for the first forwarding rule 335, the second forwarding rule 337, and/or additional forwarding rules).

The SDN controller module 345 may output either the first property 339 or the second property 341 as a current property to be processed. In some embodiments, other properties may be output before the first property 339 or the second property 341 and "current property to be processed" as used herein merely refers to a given property to be processed rather than, e.g., a specific property output for processing.

In some embodiments, the SDN controller module 345 may use a data plane checker to verify whether the current property to be processed is valid in a model of the network with changes induced by the current forwarding rule to be processed. The SDN controller module 345 may verify whether the current property to be processed is valid in the model of the network using any appropriate data plane checker. For example, the data plane checker may include an HSA data plane checker, a Veriflow data plane checker, and/or a delta-net data plane checker. The data plane checker may be the same as or similar to the data plane checker 218 discussed above in relation to FIG. 2.

The property value of each property that is processed may be denoted as $R_p=(d_p, t_p)$, where R is the property value, d is the duration value, t is the property start time value, and p is an index to designate specific values, where p may be an integer from 1 to n and n indicates the last one of the specific values. For example $R_1$ may refer to the first property value and $d_1$ and $t_1$ may refer to the first duration value and the first property start time value of the first property value $R_1$. Each property value $R_p$ that is processed may be initialized as $R_p=(d_p, t_p)=(0, -1)$.

In response to the current property to be processed being valid in the model of the network, the SDN controller module 345 may update the corresponding property value $R_p$ according to a first equation set (e.g., Equation 3 and Equation 4). In some embodiments, the SDN controller module 345 may determine whether the corresponding property start time value $t_p$ is greater than negative one.

In response to the corresponding property start time value $t_p$ being less than or equal to negative one, the corresponding property value $R_p$ may be updated according to Equation 3:

$$R_p=(d_p, t'), \qquad \text{Equation 3}$$

In Equation 3, $R_p$ may be the corresponding property value, $d_p$ may be the corresponding duration value, and t' may be the time value of the corresponding forwarding rule. For example, if the time value t' of the corresponding forwarding rule is eleven seconds after the time reference event, and the first property value $R_1$ is being updated for the first time since being initialized at (0, -1), the first property value $R_1$ may be updated to $R_1=(0, 11)$.

In response to the corresponding property start time value $t_p$ being greater than negative one, which indicates the corresponding property value $R_p$ has been updated at least once before, the corresponding property value $R_p$ may be updated according to Equation 4:

$$R_p=(d_p+(t'-t_p), t'), \qquad \text{Equation 4}$$

In Equation 4, $R_p$ may be the corresponding property value, $d_p$ may be the corresponding duration value, $t_p$ may be the corresponding property start time value, and t' may be the time value of the corresponding forwarding rule. Forwarding rules may arrive in an order sorted by time stamp (e.g., t-order), t' may be greater than or equal to $t_p$. Therefore, a difference between t' and $t_p$ (e.g., $t'-t_p$) may be non-negative. For example, if the second property start time value $t_2$ is nine seconds after the time reference event, the time value t' of the corresponding forwarding rule is eleven seconds after the time reference event, and the second duration value $d_2$ is equal to ten, the second property value $R_2$ may be updated from $R_2=(10, 9)$ to $R_2=(10+(11-9), 11)=(12, 10)$.

In response to the current property to be processed not being valid in the model of the network, the SDN controller module 345 may update the corresponding property value according to a second equation set (e.g., Equation 5 and Equation 6). In some embodiments, the SDN controller module 345 may also determine whether the corresponding property start time value $t_p$ is greater than negative one.

In response to the corresponding property start time value $t_p$ being less than or equal to negative one, the corresponding property value $R_p$ may be updated according to Equation 5.

$$R_p=(d_p,-1), \qquad \text{Equation 5}$$

In Equation 5, $R_p$ may be the corresponding property value and $d_p$ may be the corresponding duration value. For example, if the first duration value $d_1$ is equal to ten (e.g., the first duration value $d_1$ has been updated at least one time since being initialized), the first property value $R_1$ may be updated to $R_1=(10, -1)$.

In response to the corresponding property start time value $t_p$ being greater than negative one, the corresponding property value $R_p$ may be updated according to Equation 6.

$$R_p=(d_p+(t'-t_p),-1), \qquad \text{Equation 6}$$

In Equation 6, $R_p$ may be the corresponding property value, $d_p$ may be the corresponding duration value, $t_p$ may be the corresponding property start time value, and t' may be the time value of the corresponding forwarding rule. For example, if the second property start time value $t_2$ is nine seconds after the time reference event, the time value t' of the corresponding forwarding rule is eleven seconds after the time reference event, and the second duration value $d_2$ is equal to ten (e.g., the second duration value $d_2$ has been updated at least one time since being initialized), the second property value may be updated to $R_2=(10(11-9), -1)=(12, -1)$. The negative one integer in equation 6 may therefore be used as the corresponding property start time value $t_p$ for a subsequent time the corresponding property value $R_p$ is updated.

In some embodiments, the SDN controller module 345 may identify another property (e.g., a property that was not identified as the current property to be processed) as a subsequent current property to be processed. The process described above may be repeated using the subsequent current property to be processed in place of the current property to be processed.

In some embodiments, the SDN controller module 345 may identify another forwarding rule (e.g., a forwarding rule that was not identified as the current forwarding rule to be processed) as a subsequent current forwarding rule to be processed. The process described above may be repeated using the subsequent forwarding rule to be processed in place of the current forwarding rule to be processed.

In some embodiments, the SDN controller module 345 may calculate a first length of validity value and a second length of validity value. The first length of validity value may indicate a total duration in which the first property 339 was valid for the first forwarding rule 335 and/or the second forwarding rule 337. Additionally, the second length of validity value may indicate a total duration in which the second property 341 was valid for the first forwarding rule 335 and/or the second forwarding rule 337. The first length of validity value and/or the second length of validity value may be based on the corresponding updated duration values. For example, if the first property 339 is valid for both the first forwarding rule 335 and the second forwarding rule 337, the first length of validity value may be equal to the updated duration value after being updated for both the first forwarding rule 335 and the second forwarding rule 337 using the first equation set and/or the second equation set. As another example, if the second property 341 is valid only for the first forwarding rule 335, the second length of validity value may be equal to the updated duration value after being updated for only the first forwarding rule 335 using the first equation set and/or the second equation set.

The SDN controller module 345 may classify either the first property 339 or the second property 341 as the relatively longer valid property based on whether the first length of validity value is relatively greater or the second length of validity value is relatively greater. Additionally, the SDN controller module 345 may generate the length of validity value list 336 to include the first property 339 and the second property arranged (e.g., ranked) in a sequence based on which length of validity value is greater. For example, if the second length of validity value is equal to twenty one and the first length of validity value is equal to seventeen, the second property 341 may be included in a first position in the length of validity value list 336 as the relatively longer valid property. More generally, properties with greater length of validity values may be positioned higher than and/or in front of properties with lower length of validity values in the length of validity value list 336.

Modifications, additions, or omissions may be made to FIG. 3 without departing from the scope of the present disclosure. For example, the environment 300 may include more or fewer elements than those illustrated and described in the present disclosure. In addition, in some embodiments, one or more routines, one or more instructions, or at least a portion of code of the SDN controller module 345 may be combined or separated. In some embodiments operations may be performed in a different order from what is described above. Additionally, while the environment 300 is illustrated as including two forwarding rules (e.g., the first forwarding rule 335 and the second forwarding rule 337) and two properties (e.g., the first property 339 and the second property 341), the environment 300 may include any number of forwarding rules and/or properties, such as four forwarding rules and/or five properties, twenty forwarding rules and/or forty properties, and one thousand forwarding rules and/or one thousand properties.

FIGS. 4A-4B illustrate a flowchart of an example method 400 for determining the length of validity value of properties. The method 400 may be performed by any suitable system, apparatus or device. For example, the SDN controller 114 of FIG. 1, the SDN controller module 345 of FIG. 3, the computing system 800 of FIG. 8, or one or more of the components of the computing system 800 of FIG. 8 may perform one or more of the operations associated with the method 400. In these and other embodiments, program instructions stored on a computer readable medium may be executed to perform one or more of the operations of the method 400. Further, each operation of the method 400 may be static or dynamic, and may be performed online (e.g., in real-time), or offline. Further, each operation of the method 400 may be performed incrementally or non-incrementally.

At block 402, one or more forwarding rules may be obtained. The forwarding rules may be obtained as discussed above in relation to FIG. 3. The forwarding rules may be the same as or similar to the first forwarding rule 335 and the second forwarding rule 337 discussed above in relation to FIG. 3. Additionally, the forwarding rules may be associated with a network, such as the physical network 112 of FIG. 1. In some embodiments, each of the forwarding rules may include a time value that indicates a time the corresponding forwarding rule was generated.

At block 404, two or more properties to be validated may be identified. In some embodiments, each property to be validated may include a property value. The property values may act as persistent storage of time sensitive information related to the properties. Each property value may include a duration value and a property start time value. The duration value may indicate a duration of time in which the corresponding property was valid for the forwarding rules. The property start time value may indicate a time in which the corresponding property became valid for the forwarding rules. Each property value may be represented according to Equation 1 discussed above. The property values may be the same as or similar to the property values discussed above in relation to FIG. 3.

At block 406, the property value for each property to be validated may be initialized. In some embodiments, each duration value may be set to zero and each property start time value may be set to negative one (e.g., set to indicate that the corresponding property has not been validated for any of the forwarding rules).

At block 408, a forwarding rule may be classified as a current forwarding rule to use for property validation. At block 410, a property may be classified as a current property to use for property validation.

At block 412, it may be determined whether the current property is valid for the current forwarding rule. For example, the current property may be verified in a model of the network with changes induced by the current forwarding rule. A data plane checker may be used to verify whether the current property is valid in the model of the network with changes induced by the current forwarding rule as discussed above in relation to FIG. 3. If the current property is valid for the current forwarding rule, block 412 may be followed by block 414. If the current property is not valid for the current forwarding rule, block 412 may be followed by block 416.

At block 414, it may be determined whether the property start time value of the current property value is greater than negative one. If the property start time value of the current property value is greater than negative one, block 414 may be followed by block 418. If the property start time value of the current property value is not greater than negative one, block 414 may be followed by block 420.

At block 416, it may be determined whether the property start time value of the current property value is greater than negative one. If the property start time value of the current property value is greater than negative one, block 416 may be followed by block 422. If the property start time value of the current property value is not greater than negative one, block 416 may be followed by block 424.

At block 418, the duration value and the property start time value of the current property value may be updated according to a first equation. In some embodiments, the first equation may be the same as or similar to Equation 4. In these and other embodiments, the duration value and the property start time value of the current property value may be updated as discussed above in relation to FIG. 3.

At block 420, the duration value and the property start time value of the current property value may be updated according to a second equation. In some embodiments, the second equation may be the same as or similar to Equation 3. In these and other embodiments, the duration value and the property start time value may be updated as discussed above in relation to FIG. 3.

At block 422, the duration value and the property start time value of the current property value may be updated according to a third equation. In some embodiments, the third equation may be the same as or similar to Equation 6. In these and other embodiments, the duration value and the property start time value of the current property value may be updated as discussed above in relation to FIG. 3.

At block 424, the duration value and the property start time value of the current property value may be updated according to a fourth equation. In some embodiments, the fourth equation may be the same as or similar to Equation 5. In these and other embodiments, the duration value and the property start time value of the current property value may be updated as discussed above in relation to FIG. 3.

At block 426, it may be determined whether there are any additional properties to use for property validation. If there are additional properties to use for property validation, block 426 may be followed by block 428. If there are not additional properties to use for property validation, block 426 may be followed by block 430.

At block 428, a subsequent property may be classified as the current property to use for property validation. Block 428 may be followed by block 412. The method 400 may repeat a portion or all of the operations of blocks 412, 414, 416, 418, 420, 422, 424, 426, and 428 with the subsequent property as the current property to use for property validation.

At block 430, it may be determined whether there are any additional forwarding rules to use for property validation. If there are additional forwarding rules to use for property validation, block 430 may be followed by block 432. If there are not additional forwarding rules to use for property validation, block 430 may be followed by block 434.

At block 432, a subsequent forwarding rule may be classified as the current forwarding rule for property validation. Block 432 may be followed by block 412. The method 400 may repeat a portion or all of the operations of blocks 412, 414, 416, 418, 420, 422, 424, 426, 428, 430, and 432 with the subsequent forwarding rule as the current forwarding rule for property validation. Additionally, the corresponding property values may be used as persistent storage of the time sensitive information related to the properties and/or may be used in subsequent calculations.

At block 434, a length of validity value may be calculated for each property used for property validation. In some embodiments, each length of validity value may indicate a total duration in which the corresponding property was valid for the forwarding rules. The length of validity value may be based on the corresponding updated duration values. For example, if a property is valid for three forwarding rules, the corresponding length of validity value may be equal to the updated duration value after being updated for all three forwarding rules.

At block 436, a particular property may be classified as a relatively longer valid property. In some embodiments, the particular property may be classified as the relatively longer valid property based on whether the corresponding length of validity value is relatively greater than the other length of validity values.

Modifications, additions, or omissions may be made to the method 400 without departing from the scope of the present disclosure. For example, the operations of the method 400 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 5:
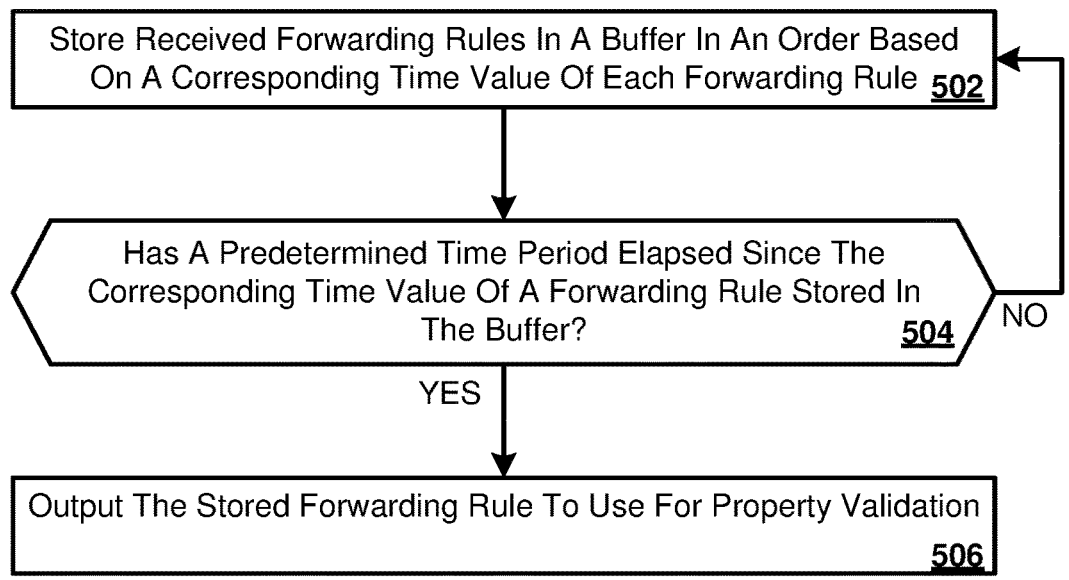
FIG. 5 illustrates a flowchart of an example method for determining when to output a forwarding rule for property validation.

FIG. 5 illustrates a flowchart of an example method 500 for determining when to output a forwarding rule for property validation. The method 500 may be performed by any suitable system, apparatus or device. For example, the SDN controller 114 of FIG. 1, the SDN controller module 345 of FIG. 3, the computing system 800 of FIG. 8, or one or more of the components of the computing system 800 of FIG. 8 may perform one or more of the operations associated with the method 500. In these and other embodiments, program instructions stored on a computer readable medium may be executed to perform one or more of the operations of the method 500. Further, each operation of the method 500 may be static or dynamic, and may be performed online (e.g., in real-time), or offline. Further, each operation of the method 500 may be performed incrementally or non-incrementally.

At block 502, received forwarding rules may be stored in a buffer in an order based on a corresponding time value of each forwarding rule. In some embodiments, the forwarding rules may be received out of order relative to the corresponding time values. In these and other embodiments, the stored forwarding rules may be arranged in the buffer in sequential order from earlier relative time value to later relative time value. In some embodiments, each forwarding rule may include the corresponding time value that indicates a time the corresponding forwarding rule was generated.

In these and other embodiments, the buffer may be the same as or similar to the buffer 343 discussed above in relation to FIG. 3. The received forwarding rules may be the same as or similar to the first forwarding rule 335 and the second forwarding rule 337 discussed above in relation to FIG. 3.

At block 504, it may be determined whether a predetermined time period has elapsed since the corresponding time value of a forwarding rule stored in the buffer. In some embodiments, the time period may be based on any appropriate unit of measurement of time. The time period may be determined relative to the corresponding time values as discussed in the present disclosure. If the time period has not elapsed since the corresponding time value of a forwarding rule stored in the buffer, block 504 may be followed by block 502, the method 500 may repeat the operations of blocks 502 and 504 until the time period has elapsed since the corresponding time value of a forwarding rule stored in the buffer. If the time period has elapsed since the corresponding time value of a forwarding rule stored in the buffer, block 504 may be followed by block 506.

At block 506, the stored forwarding rule may be output to use for property validation. In some embodiments, the stored forwarding rule output for property validation may be used according to some or all of the method 400 of FIGS. 4A-4B.

Modifications, additions, or omissions may be made to the method 500 without departing from the scope of the present disclosure. For example, the operations of the method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 6:
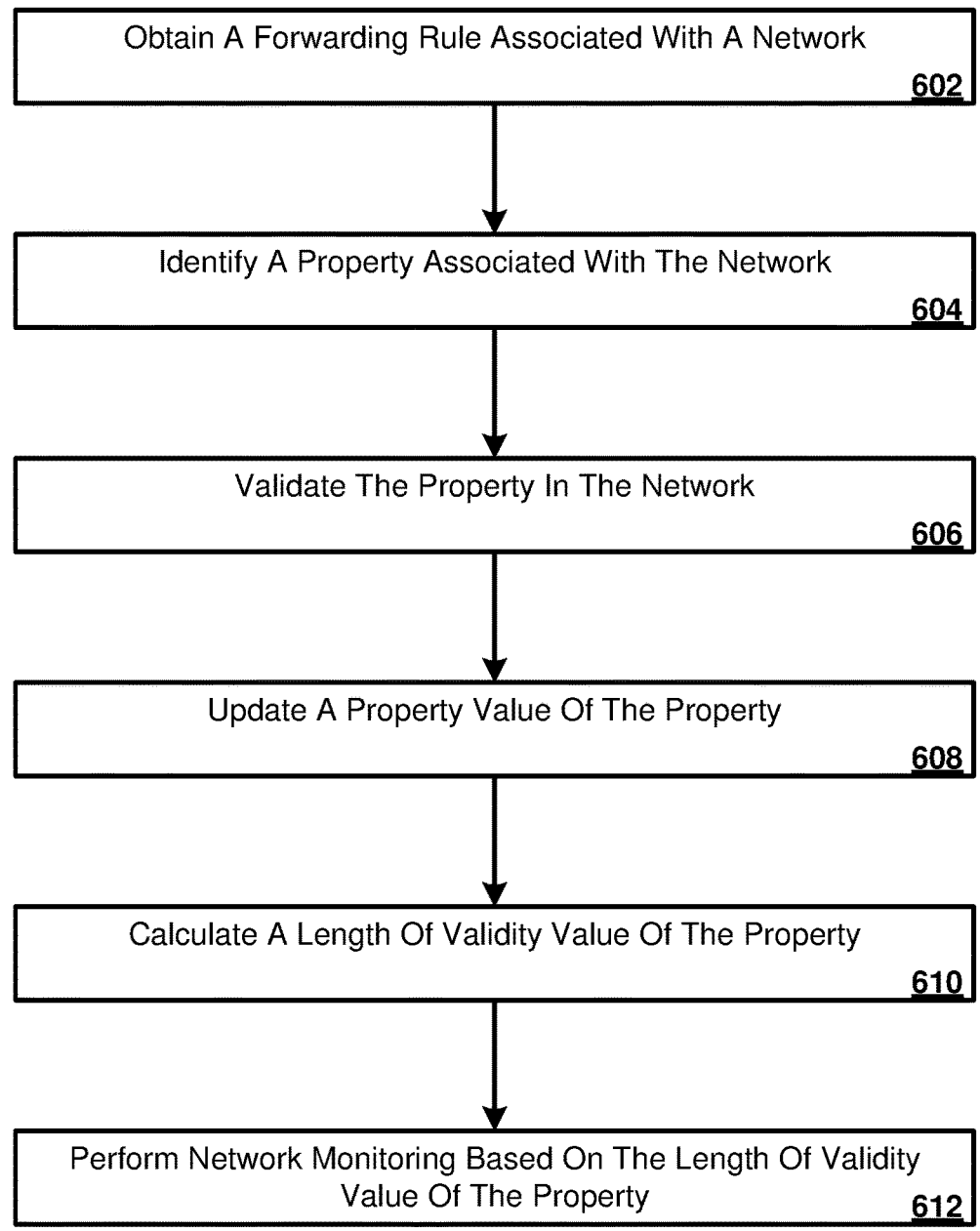
FIG. 6 illustrates a flowchart of an example method for calculating the length of validity value of a property.

FIG. 6 illustrates a flowchart of an example method 600 for calculating a length of validity value of a property. The method 600 may be performed by any suitable system, apparatus or device. For example, the SDN controller 114 of FIG. 1, the SDN controller module 345 of FIG. 3, the computing system 800 of FIG. 8, or one or more of the components of the computing system 800 of FIG. 8 may perform one or more of the operations associated with the method 600. In these and other embodiments, program instructions stored on a computer readable medium may be executed to perform one or more of the operations of the method 600. Further, each operation of the method 600 may be static or dynamic, and may be performed online (e.g., in real-time), or offline. Further, each operation of the method 600 may be performed incrementally or non-incrementally.

At block 602, a forwarding rule associated with a network may be obtained. The forwarding rule may be obtained as discussed above in relation to FIG. 3. The forwarding rule may be the same as or similar to the first forwarding rule 335 and the second forwarding rule 337 discussed above in relation to FIG. 3. The forwarding rule may be associated with a network, such as the physical network 112 of FIG. 1. In some embodiments, the forwarding rule may include a time value that indicates a time the forwarding rule was generated.

At block 604, a property associated with the network may be identified. In some embodiments, the property may include a property value. The property value may include a duration value. The duration value may indicate a duration of time in which the property was valid for the forwarding rule.

At block 606, the property may be validated in the network. In some embodiments, the property may be validated for the forwarding rule. For example, the property may be verified in a model of the network with changes induced by the forwarding rule. A data plane checker may be used to verify whether the property is valid in the model of the network with changes induced by the forwarding rule.

At block 608, the property value of the property may be updated. In some embodiments, in response to the property being valid, the property value of the property including the duration value may be updated based on a first equation set. The first equation set may include Equation 3 and Equation 4 as discussed above in relation to FIG. 3. In other embodiments, in response to the property not being valid, the property value of the property including the duration value may be updated based on a second equation set. The second equation set may include Equation 5 and Equation 6 as discussed above in relation to FIG. 3.

At block 610, a length of validity value of the property may be calculated. In some embodiments, the length of validity value may indicate a total duration in which the property was valid for the forwarding rule. The length of validity value may be based on the updated duration value.

At block 612, network monitoring may be performed based on the length of validity value of the property. Various switches of the network may be monitored to determine whether the property is still valid in the network. If the property is still valid in the network, the network may be operating satisfactorily. If the property is no longer valid in the network, the network may not be operating satisfactorily.

Modifications, additions, or omissions may be made to the method 600 without departing from the scope of the present disclosure. For example, the operations of the method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 7:
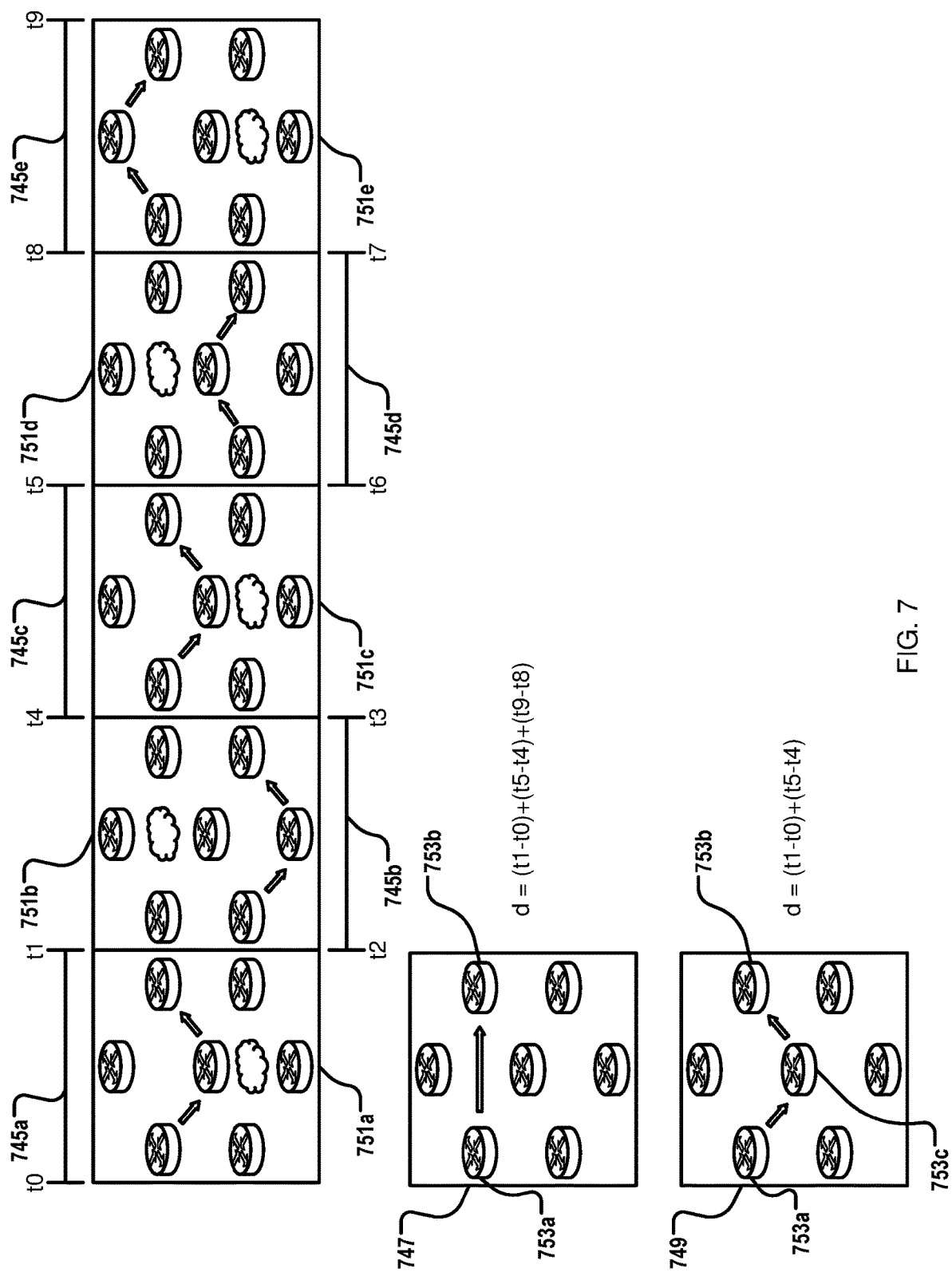
FIG. 7 illustrates example forwarding rules and properties that may be implemented in the environment of FIG. 3.

FIG. 7 illustrates example forwarding rules 751a-751e and properties 747 & 749 that may be implemented in the environment 300 of FIG. 3. The forwarding rules 751a-751e and the properties 747 & 749 may correspond to the forwarding rules and properties discussed in the present disclosure.

In some embodiments, the forwarding rules 751a-751e may correspond to and/or apply during one or more periods of time 745a-745e. For example, a first forwarding rule 751a may correspond to and/or apply during a first period of time 745a that starts at t0 and ends at t1. A second forwarding rule 751b may correspond to and/or apply during a second period of time 745b that starts at t2 and ends at t3. A third forwarding rule 751c may correspond to and/or apply during a third period of time 745c that starts at t4 and ends at t5. A fourth forwarding rule 751d may correspond to and/or apply during a fourth period of time 745d that starts at t6 and ends at t7. A fifth forwarding rule 751e may correspond to and/or apply during a fifth period of time 745e that starts at t8 and ends at t9.

Each of the forwarding rules 751a-751e may be generated in response to a modification of a physical network as discussed above. The properties 747 & 749 may represent an invariant property of the network. In some embodiments, a first property 747 may represent a reachability property between a first switch 753a and a second switch 753b of the network. In other embodiments, a second property 749 may represent a reachability property between the first switch 753a, a third switch 753c, and the second switch 753b of the network. In FIG. 7, only three switches are labelled for ease of discussion.

The first property 747 may be valid for the first forwarding rule 751a, the third forwarding rule 751c, and the fifth forwarding rule 751e. A duration value of the first property 747 for the forwarding rules 751a-751e may be $d=(t1-t0)+(t5-t4)+(t9-t8)$, in which t0 is a first property start time value associated with the first forwarding rule 751a, t1 is a time value of the first forwarding rule 751a, t4 is the first property start time value associated with the third forwarding rule 751c, t5 is a time value of the third forwarding rule 751c, t8 is the first property start time value associated with the fifth forwarding rule 751e, and t9 is a time value of the fifth forwarding rule 751e.

The first property start time value associated with the first forwarding rule 751a may be prior to first forwarding rule 751a being generated. Additionally, the first property start time value associated with the third forwarding rule 751c may be prior to the third forwarding rule 751c being generated but after the second forwarding rule 751b being generated since the first property 747 is not valid for the second forwarding rule 751b. Likewise, the first property start time associated with the fifth forwarding rule 751e may be prior to the fifth forwarding rule 751e being generated but after the fourth forwarding rule 751d being generated since the first property 747 is not valid for the fourth forwarding rule 751d.

In some embodiments, the time value of the forwarding rules 751a-751e may correspond to a time value for which the forwarding rules 751a-751e are no longer being used in the network. In other embodiments, the periods of time 745a-745e illustrated in FIG. 7 may correspond to a time period for which the forwarding rules 751a-751e are being used in the network and the properties 107 & 109 are valid. In these and other embodiments, a period of time for which the forwarding rules 751-751e are being used in the network may be longer than the periods of time 745a-745e illustrated in FIG. 7. For example, the first forwarding rule 751a may be used in the network prior to the first period of time 745a starting. As another example, the second forwarding rule 751b may be used in the network prior to the second period of time 745b starting. In some embodiments, a portion of the period of time for which the forwarding rules 751a-751e are being used in the network may overlap portions or entire periods of time 745a.

In some embodiments, the duration value of the first property 747 may be equal to a summation of the first period of time 745a, the third period of time 745c, and the fifth period of time 745e.

The second property 749 may be valid for the first forwarding rule 751 and the third forwarding rule 751c. A duration value of the second property 749 for the forwarding rules 751a-751e may be $d=(t1-t0)+(t5-t4)$, in which t0 is a second property start time value for the first forwarding rule 751a, t1 is the time value of the first forwarding rule 751a, t4 is the second property start time value for the third forwarding rule 751c, and t5 is the time value of the third forwarding rule 751c.

The second property start time value associated with the first forwarding rule 751a may be prior to first forwarding rule 751a being generated. Additionally, the second property start time value associated with the third forwarding rule 751c may be prior to the third forwarding rule 751c being generated but after the second forwarding rule 751b being generated since the second property 749 is not valid for the second forwarding rule 751b.

In some embodiments, the duration value of the second property 749 may be equal to a summation of the first period of time 745a and the third period of time 745c.

FIG. 8 is a block diagram of the example computing system 800. The computing system 800 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing system 800 may include a processor 838, a storage device 840, a memory 842, and a communication device 844. The processor 838, the storage device 840, the memory 842, and/or the communication device 844 may all be communicatively coupled such that each of the components may communicate with the other components. The computing system 800 may perform any of the operations described in the present disclosure.

In general, the processor 838 may include any suitable special-purpose or general-purpose computer, computing entity, or processing device including various computer hardware or software modules and may be configured to execute instructions stored on any applicable computer-readable storage media. For example, the processor 838 may include a microprocessor, a microcontroller, a digital signal processor (DSP), an application-specific integrated circuit (ASIC), a Field-Programmable Gate Array (FPGA), or any other digital or analog circuitry configured to interpret and/or execute program instructions and/or to process data. Although illustrated as a single processor in FIG. 8, the processor 838 may include any number of processors configured to perform, individually or collectively, any number of operations described in the present disclosure.

In some embodiments, the processor 838 may interpret and/or execute program instructions and/or process data stored in the storage device 840, the memory 842, or the storage device 840 and the memory 842. In some embodiments, the processor 838 may fetch program instructions from the storage device 840 and load the program instructions in the memory 842. After the program instructions are loaded into the memory 842, the processor 838 may execute the program instructions.

For example, in some embodiments, one or more of the processing operations for determining the relatively longer valid property may be included in the storage device 840 as program instructions. The processor 838 may fetch the program instructions of one or more of the processing operations and may load the program instructions of the processing operations in the memory 842. After the program instructions of the processing operations are loaded into the memory 842, the processor 838 may execute the program instructions such that the computing system 800 may implement the operations associated with the processing operations as directed by the program instructions.

The storage device 840 and the memory 842 may include computer-readable storage media for carrying or having computer-executable instructions or data structures stored thereon. Such computer-readable storage media may include any available media that may be accessed by a general-purpose or special-purpose computer, such as processor 838. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 838 to perform a certain operation or group of operations.

In some embodiments, the storage device 840 and/or the memory 842 may store data associated with determining the relatively longer valid property. For example, the storage device 840 and/or the memory 842 may store properties, data planes, network applications, forwarding tables, forwarding rules, forwarding behavior representations, and length of validity value lists.

The communication device 844 may include any device, system, component, or collection of components configured to allow or facilitate communication between the computing system 800 and another electronic device. For example, the communication device 844 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 844 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 8 without departing from the scope of the present disclosure. For example, the computing system 800 may include more or fewer elements than those illustrated and described in the present disclosure. For example, the computing system 800 may include an integrated display device such as a screen of a tablet or mobile phone or may include an external monitor, a projector, a television, or other suitable display device that may be separate from and communicatively coupled to the computing system 800.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    obtaining a forwarding rule associated with a network, wherein the forwarding rule includes a time value;
    identifying a property associated with the network that includes a property value comprising a duration value and a property start time value;
    validating, for the forwarding rule, the property in the network;
    responsive to the property being valid for the forwarding rule:
        updating the duration value based on at least two of the duration value, the time value, and the property start time value;
    responsive to the property being invalid for the forwarding rule:
        updating the duration value based on at least two of the duration value, the time value, the property start time value, and an integer;
    calculating a length of validity value of the property based on the updated duration value; and
    performing network monitoring based on the length of validity value of the property.

2. The method of claim 1, wherein the property is a first property, the property value is a first property value, and the duration value is a first duration value, the method further comprising:
    identifying a second property associated with the network that includes a second property value comprising a second duration value;
    validating, for the forwarding rule, the second property in the network;
    responsive to the second property being valid for the forwarding rule:
        updating the second duration value based on at least two of the duration value, the time value, and the property start time value;
    responsive to the second property being invalid for the forwarding rule:
        updating the second duration value based on at least two of the duration value, the time value, the property start time value, and the integer;
    calculating the length of validity value of the second property based on the updated second duration value; and
    classifying one of the first property and the second property as a relatively longer valid property based on the length of validity value of the first property or the second property being a relatively greater length of validity value, wherein the network monitoring is performed based on the length of validity value of the relatively longer valid property.

3. The method of claim 1 further comprising initializing the duration value to zero and the property start time value to negative one.

4. The method of claim 1, wherein the time value includes a first time value and the forwarding rule is a first forwarding rule, the method further comprising:
    obtaining a second forwarding rule associated with the network;
    validating, for the second forwarding rule, the property in the network;
    responsive to the property being valid for the second forwarding rule:
        updating the duration value based on at least two of the duration value, the time value, and the property start time value;
    responsive to the property being invalid for the second forwarding rule:
        updating the duration value based on at least two of the duration value, the time value, the property start time value, and the integer; and
    calculating the length of validity value of the property based on the updated duration value, wherein the updated duration value is based on both the first forwarding rule and the second forwarding rule.

5. The method of claim 1, wherein the time value includes a first time value and the forwarding rule is a first forwarding rule, the method further comprising:
    obtaining a second forwarding rule associated with the network, wherein the second forwarding rule includes a second time value; and
    ordering the first forwarding rule and the second forwarding rule based on the first time value and the second time value, wherein the forwarding rule with a relatively earlier time value is placed in a first position.

6. The method of claim 5, the method further comprising determining whether a time period has elapsed since the first time value or the second time value, wherein the validating, for the first forwarding rule, the property in the network is performed responsive to the time period elapsing since the first time value and the validating, for the second forwarding rule, the property in the network is performed responsive to the time period elapsing since the second time value.

7. A non-transitory computer-readable medium having computer-readable instructions stored thereon that are executable by a processor to perform or control performance of operations comprising:
    obtaining a forwarding rule associated with a network, wherein the forwarding rule includes a time value;
    identifying a property associated with the network that includes a property value comprising a duration value and a property start time value;
    validating, for the forwarding rule, the property in the network;
    responsive to the property being valid for the forwarding rule:

updating the duration value based on at least two of the duration value, the time value, and the property start time value;
responsive to the property being invalid for the forwarding rule:
updating the duration value based on at least two of the duration value, the time value, the property start time value, and an integer;
calculating a length of validity value of the property based on the updated duration value; and
performing network monitoring based on the length of validity value of the property.

8. The non-transitory computer-readable medium of claim 7, wherein the property is a first property, the property value is a first property value, and the duration value is a first duration value, the operations further comprising:
identifying a second property associated with the network that includes a second property value comprising a second duration value;
validating, for the forwarding rule, the second property in the network;
responsive to the second property being valid for the forwarding rule:
updating the second duration value based on at least two of the duration value, the time value, and the property start time value;
responsive to the second property being invalid for the forwarding rule:
updating the second duration value based on at least two of the duration value, the time value, the property start time value, and the integer;
calculating the length of validity value of the second property based on the updated second duration value; and
classifying one of the first property and the second property as a relatively longer valid property based on the length of validity value of the first property or the second property being a relatively greater length of validity value, wherein the network monitoring is performed based on the length of validity value of the relatively longer valid property.

9. The non-transitory computer-readable medium of claim 7, the operations further comprising initializing the duration value to zero and the property start time value to negative one.

10. The non-transitory computer-readable medium of claim 7, wherein the time value includes a first time value and the forwarding rule is a first forwarding rule, the operations further comprising:
obtaining a second forwarding rule associated with the network;
validating, for the second forwarding rule, the property in the network;
responsive to the property being valid for the second forwarding rule:
updating the duration value based on at least two of the duration value, the time value, and the property start time value;
responsive to the property being invalid for the second forwarding rule:
updating the duration value based on at least two of the duration value, the time value, the property start time value, and the integer; and
calculating the length of validity value of the property based on the updated duration value, wherein the updated duration value is based on both the first forwarding rule and the second forwarding rule.

11. The non-transitory computer-readable medium of claim 7, wherein the time value includes a first time value and the forwarding rule is a first forwarding rule, the operations further comprising:
obtaining a second forwarding rule associated with the network, wherein the second forwarding rule includes a second time value; and
ordering the first forwarding rule and the second forwarding rule based on the first time value and the second time value, wherein the forwarding rule with a relatively earlier time value is placed in a first position.

12. The non-transitory computer-readable medium of claim 11, the operations further comprising determining whether a time period has elapsed since the first time value or the second time value, wherein the validating, for the first forwarding rule, the property in the network is performed responsive to the time period elapsing since the first time value and the validating, for the second forwarding rule, the property in the network is performed responsive to the time period elapsing since the second time value.

13. A system comprising:
one or more computer-readable storage media configured to store instructions; and
one or more processors communicatively coupled to the one or more computer-readable storage media and configured to, in response to execution of the instructions, cause the system to perform operations, the operations comprising:
obtaining a forwarding rule associated with a network, wherein the forwarding rule includes a time value;
identifying a property associated with the network that includes a property value comprising a duration value and a property start time value;
validating, for the forwarding rule, the property in the network;
responsive to the property being valid for the forwarding rule:
updating the duration value based on at least two of the duration value, the time value, and the property start time value;
responsive to the property being invalid for the forwarding rule:
updating the duration value based on at least two of the duration value, the time value, the property start time value, and an integer;
calculating a length of validity value of the property based on the updated duration value; and
performing network monitoring based on the length of validity value of the property.

14. The system of claim 13, wherein the property is a first property, the property value is a first property value, and the duration value is a first duration value, the operations further comprising:
identifying a second property associated with the network that includes a second property value comprising a second duration value;
validating, for the forwarding rule, the second property in the network;
responsive to the second property being valid for the forwarding rule:
updating the second duration value based on at least two of the duration value, the time value, and the property start time value;
responsive to the second property being invalid for the forwarding rule:

updating the second duration value based on at least two of the duration value, the time value, the property start time value, and the integer;

calculating the length of validity value of the second property based on the updated second duration value; and classifying one of the first property and the second property as a relatively longer valid property based on the length of validity value of the first property or the second property being a relatively greater length of validity value, wherein the network monitoring is performed based on the length of validity value of the relatively longer valid property.

15. The system of claim 13, the operations further comprising initializing the duration value to zero and the property start time value to negative one.

16. The system of claim 13, wherein the time value includes a first time value and the forwarding rule is a first forwarding rule, the operations further comprising:

obtaining a second forwarding rule associated with the network;

validating, for the second forwarding rule, the property in the network;

responsive to the property being valid for the second forwarding rule:

updating the duration value based on at least two of the duration value, the time value, and the property start time value;

responsive to the property being invalid for the second forwarding rule:

updating the duration value based on at least two of the duration value, the time value, the property start time value, and the integer; and calculating the length of validity value of the property based on the updated duration value, wherein the updated duration value is based on both the first forwarding rule and the second forwarding rule.

17. The system of claim 13, wherein the time value includes a first time value and the forwarding rule is a first forwarding rule, the operations further comprising:

obtaining a second forwarding rule associated with the network, wherein the second forwarding rule includes a second time value;

ordering the first forwarding rule and the second forwarding rule based on the first time value and the second time value, wherein the forwarding rule with a relatively earlier time value is placed in a first position.

* * * * *